US012098436B2

(12) United States Patent
Finnouche et al.

(10) Patent No.: US 12,098,436 B2
(45) Date of Patent: Sep. 24, 2024

(54) SEAL GAS OPTIMIZATION SYSTEMS AND METHODS FOR A DIRECT REDUCTION PROCESS

(71) Applicant: Midrex Technologies, Inc., Charlotte, NC (US)

(72) Inventors: Faycal Finnouche, Algiers (DZ); David Oswald, Hartwell, GA (US)

(73) Assignee: Midrex Technologies, Inc., Charlotte, NC (US)

( * ) Notice: Subject to any disclaimer, the term of this patent is extended or adjusted under 35 U.S.C. 154(b) by 0 days.

(21) Appl. No.: 18/107,146

(22) Filed: Feb. 8, 2023

(65) Prior Publication Data

US 2023/0183826 A1    Jun. 15, 2023

Related U.S. Application Data

(62) Division of application No. 16/908,810, filed on Jun. 23, 2020, now Pat. No. 11,655,511.

(51) Int. Cl.
*C21B 5/00* (2006.01)
*C23F 14/02* (2006.01)
(Continued)

(52) U.S. Cl.
CPC ............. *C21B 5/006* (2013.01); *C23F 14/02* (2013.01); *C21B 2100/22* (2017.05); *F27D 7/02* (2013.01); *F27D 2007/063* (2013.01)

(58) Field of Classification Search
CPC ............ C21B 13/0073; C21B 2100/22; C21B 5/006; C23F 14/02; F27D 17/004
(Continued)

(56) References Cited

U.S. PATENT DOCUMENTS 3,899,294 A    8/1975  Magiros
4,251,267 A    2/1981  Beggs et al.
(Continued)

FOREIGN PATENT DOCUMENTS

WO    2019225256 A1    11/2019

OTHER PUBLICATIONS

Aug. 24, 2020 International Search Report issued on International Application No. PCT/US2020/039042.
(Continued)

*Primary Examiner* — Jessee R Roe
*Assistant Examiner* — Michael Aboagye
(74) *Attorney, Agent, or Firm* — Clements Bernard Walker; Christopher L. Bernard

(57) ABSTRACT

A method and system for operating a seal gas compressor utilized in a direct reduction process including: monitoring a pH level of a water stream used in the seal gas compressor, wherein the pH level of the water stream is affected by a reformer flue gas stream that comes into contact with the water stream, wherein the monitoring step is carried out one or more of upstream of the seal gas compressor and downstream of the compressor; and adjusting the pH level of the water stream to maintain the pH level of the water stream within a predetermined range based on feedback from the monitoring step. The method includes maintaining the pH level of the water stream upstream of the seal gas compressor in a range between 7.5 and 10 and maintaining the pH level of the water stream downstream of the seal gas compressor in a range between 7.8 and 9.5.

4 Claims, 3 Drawing Sheets

(51) Int. Cl.
*F27D 7/02* (2006.01)
*F27D 7/06* (2006.01)

(58) Field of Classification Search
USPC .................................................. 266/156, 197
See application file for complete search history.

(56) References Cited

U.S. PATENT DOCUMENTS

| | | | |
|---|---|---|---|
| 4,698,219 A | 10/1987 | Tsao et al. | |
| 4,854,942 A * | 8/1989 | Denney | B01D 3/06 48/212 |
| 5,230,810 A | 7/1993 | Clark et al. | |
| 5,340,378 A * | 8/1994 | Huestis | C21B 13/029 75/496 |
| 5,447,551 A | 9/1995 | Huestis et al. | |
| 5,607,623 A | 3/1997 | Benton et al. | |
| 5,730,879 A | 3/1998 | Wilding | |
| 6,214,082 B1 * | 4/2001 | Rosenfellner | C21B 13/14 75/505 |
| 9,108,869 B2 | 8/2015 | Maumdar et al. | |
| 10,065,857 B2 | 9/2018 | Meissner et al. | |
| 10,274,212 B2 * | 4/2019 | Baelden | F24F 12/00 |
| 2010/0230331 A1 * | 9/2010 | Fukuda | C02F 1/38 210/197 |
| 2015/0032993 A1 | 1/2015 | Kim et al. | |
| 2020/0318206 A1 | 10/2020 | Millner | |
| 2021/0189236 A1 | 6/2021 | Frail | |

OTHER PUBLICATIONS

Mar. 16, 2023 European Search Report issued in corresponding EP Application No. 20941929.

* cited by examiner

SEAL GAS OPTIMIZATION SYSTEMS AND METHODS FOR A DIRECT REDUCTION PROCESS

CROSS-REFERENCED TO RELATED APPLICATION(S)

The present disclosure is a divisional of U.S. patent application Ser. No. 16/908,810, filed on Jun. 23, 2020, now U.S. Pat. No. 11,655,511, and entitled SEAL GAS OPTIMIZATION SYSTEMS AND METHODS FOR A DIRECT REDUCTION PROCESS, the contents of which are incorporated in full by reference herein.

TECHNICAL FIELD

The present disclosure relates generally to systems and methods for the production of direct reduced iron (DRI) or the like. More particularly, the present disclosure relates to seal gas optimization systems and methods for a direct reduction (DR) process.

BACKGROUND

An important component of a DR process, such as the MIDREX DRI process, is the seal gas system, and the seal gas compressor as part of the seal gas system. Seal gas—derived from spent reformer flue gas—is used to protect the plant from explosive gases and enables the DR process to work effectively because atmospheric air is excluded from the reduction process. Optimizing the operation of the seal gas compressor and minimizing problems therewith enables optimum productivity and product quality.

The general problem for seal gas compressor management is that the incoming feed water stream is impacted by the composition of the reformer flue gas. Generally, the feed water used in the seal gas compressor is softened, clean industrial or reverse osmosis (RO) water. An abbreviated makeup analysis for such water is provided in Table 1 below.

TABLE 1

Abbreviated Water Chemistries

| Parameter | Unit | Raw Water | Soft Water | RO Water |
| --- | --- | --- | --- | --- |
| pH | — | 7.0-9.0 | 8.0-9.0 | 5.0-7.0 |
| Conductivity | µS/m | 462 | — | — |
| Total suspended solids (TSS) | mg/l | 1 | <1 | <1 |
| Total dissolved solids (TDS) | mg/l | 320 | — | <25 |
| Oil and grease | mg/l | 1 | ND | ND |
| Total hardness | mg/l CaCO3 | 160 | <20 | <10 |
| Calcium hardness | mg/l CaCO3 | <35 | <10 | <5 |
| Magnesium hardness | mg/l CaCO3 | <50 | <10 | <5 |
| M alkalinity (TAC) | mg/l CaCO3 | 35 | Set by vendor based upon treatment | <5 |

Regardless of the water source, the $CO_2$ in the reformer flue gas mixes with the make-up water stream and forms carbonic acid as follows:

$$CO_2(aq) + H_2O \leftrightarrow H_2CO_3(aq) \quad (1)$$

This is a weak acid, so some of it dissociates to produce H+ ions (see below), hence the incoming water stream to the compressor is acidic. The pH could be as low as 4.5.

$$H_2CO_3(aq) \rightarrow H_3O^+(aq) + HCO_3^-(aq) \quad (2)$$

$$HCO_3^-(aq) \rightarrow H^+(aq) + CO_3^{-2}(aq) \quad (3)$$

At this depressed water pH, the corrosion rate for the carbon steel and cast iron components becomes great. Without chemical adjustment to the water, the life of the equipment is greatly reduced.

A secondary concern if clean industrial water is used (and, to a lesser extent, if softened water is used) is the potential scaling that occurs due to the following reaction:

$$CaO + H_2O \rightarrow Ca(OH)_2 \quad (4)$$

$$Ca(OH)_2 + CO_2 \rightarrow CaCO_3 \downarrow + H_2O \quad (5)$$

In this reaction, as the heat of compression occurs, the precipitation of calcium carbonate increases because the solubility of calcium carbonate is inverse to temperature. Based upon the water chemistry (i.e., the calcium ions) and the pH adjustment chemical, scaling potential can vary, but can be significant.

Both of these issues are ongoing concerns within DRI plants that use lobe compressors because the existing treatments and monitoring systems have not fully eliminated the problems. Within the design of conventional DRI plants, no comprehensive solution to these problems has been developed. Typically, licensees and water treatment suppliers have offered some degree of problem avoidance, discussed below, but there is not a comprehensive resolution of the above reactions with the current state of equipment and process control. Due to these limitations, corrosion and scaling can result in the following:

1) Reduced production,
2) Excessive maintenance and repair requirements of the compressor or lobe components, the wet seal gas system, and the seal gas dryer,
3) Downstream deposition that hinders production rates,
4) Loss of product quality: re-oxidation of the metalized product, and/or
5) Indirectly, the occurrence of severe clustering in the furnace, increasing downtime for removing it.

Caustic feed solutions have the desired outcome of adjusting the pH, but result in excessive feed scaling and underfeed corrosion, which is controlled by a dosing pump and optional timer. No real measurement method is available and the practical outcome is inconsistent performance and consistent field checks to ensure that the system is working properly.

Corrosion inhibitor solutions have the desired outcome of reducing seal gas compressor corrosion, but provide inconsistent chemical feed or effectiveness because the pH is often incorrect, which is again controlled by a dosing pump and optional timer. Coupons provide lagging indicators and a corrater provides a real time indicator and the practical outcome is a lack or real time decision making and potential corrater failure.

Alternative metallurgical lobe material (stainless steel and nickel) solutions have the desired outcome of providing improved lobe performance and longer equipment life, but are expensive. Lobe life is improved, but corrosive water still affects the pipework utilized.

This background provides a general context and environment in which the concepts of the present disclosure may be implemented. It will be readily apparent to those of ordinary skill in the art that these concepts may be practiced in other contexts and environments equally. Thus, this background is illustrative only.

SUMMARY

The present disclosure provides systems and methods that incorporate control measurement and chemical feed adjustment to ensure critical parameters such that the seal gas compressor (SGC) process water system can be managed. In doing so, critical system variables can be controlled and the current limitations with existing equipment/treatments are overcome. In achieving these results, the process reliability of the SGC is improved.

An overview of the parameters controlled in the present disclosure is as follows:

1) Incoming water pH is controlled to a desired pH range of 7.8-9.0 continuously utilizing probes and feed forward logic from the Distributed Control System (DCS) and chemical feed pumps,
2) Discharge water pH is controlled, ensuring that the discharge pH range is in a range that minimizes scaling and corrosion and ensures that the optimal effectiveness of corrosion and scaling inhibition chemicals is achieved,
3) Chemical feed does not rely on one family of chemistry, but includes film forming, vapor phases and electrochemical treatments to optimize system wide corrosion control in both the water and gaseous vapor regions of the process,
4) Effective performance metric ranges (e.g., pH and corrosion rates) are established in the DCS and adjustments to chemical feed control are directed by these median set points, so that upper and lower control rates are controlled, and
5) Minor modifications to process water drains are accomplished to enable effective water monitoring.

In one illustrative embodiment, a method for operating a seal gas compressor utilized in a direct reduction process includes: monitoring a pH level of a water stream used in the seal gas compressor, wherein the pH level of the water stream is affected by a reformer flue gas stream that comes into contact with the water stream, wherein the monitoring step is carried out at one or more locations upstream of the seal gas compressor and downstream of the compressor; and adjusting the pH level of the water stream to maintain the pH level of the water stream within a predetermined range based on feedback from the monitoring step. The method includes maintaining the pH level of the water stream upstream of the seal gas compressor in a range between 7.5 and 10. The method includes maintaining the pH level of the water stream downstream of the seal gas compressor in a range between 7.8 and 9.5. Adjusting the pH level of the water stream includes injecting a pH adjusting chemical into the water stream based on the feedback from the monitoring step. The method further includes: monitoring a corrosiveness of the water stream used in the seal gas compressor, wherein the corrosiveness of the water stream is affected by the reformer flue gas stream that comes into contact with the water stream, and adjusting the corrosiveness of the water stream to maintain the corrosiveness of the water stream within a predetermined range based on feedback from the monitoring step. The method further includes maintaining the corrosiveness of the water stream in a range under 2.0 mils per year (mpy).

In another illustrative embodiment, a system for operating a seal gas compressor utilized in a direct reduction process includes: a Distributed Control System; one or more pH probes coupled to the Distributed Control System and operable for monitoring a pH level of a water stream used in the seal gas compressor, wherein the pH level of the water stream is affected by a reformer flue gas stream that comes into contact with the water stream, wherein the monitoring is carried out one or more of upstream of the seal gas compressor and downstream of the compressor; and a pH adjusting chemical injector coupled to the Distributed Control System and operable for adjusting the pH level of the water stream to maintain the pH level of the water stream within a predetermined range based on feedback from the one or more pH probes at the direction of the Distributed Control System. The system maintains the pH level of the water stream upstream of the seal gas compressor in a range between 7.5 and 10. The system maintains the pH level of the water stream downstream of the seal gas compressor in a range between 7.8 and 9.5. The system further includes: a corrater probe coupled to the Distributed Control System and operable for monitoring a corrosiveness of the water stream used in the seal gas compressor, wherein the corrosiveness of the water stream is affected by the reformer flue gas stream that comes into contact with the water stream, and a corrosiveness chemical injector coupled to the Distributed Control System and operable for adjusting the corrosiveness of the water stream to maintain the corrosiveness of the water stream within a predetermined range based on feedback from the monitoring step. The system further maintains the corrosiveness of the water stream in a range under 2.0 mpy. The corrosiveness chemical injector is operable for delivering one or more of a film forming, vapor phase, and electrochemical treatment to the water stream. Optionally, one of the one or more pH probes is collocated with the corrater probe.

In a further illustrative embodiment, a direct reduction system includes: a furnace; a seal gas compressor operable for delivering seal gas to the furnace; a reformer operable for delivering a reformer flue gas stream to the seal gas compressor; a Distributed Control System; one or more pH probes coupled to the Distributed Control System and operable for monitoring a pH level of a water stream used in the seal gas compressor, wherein the pH level of the water stream is affected by the reformer flue gas stream that comes into contact with the water stream, wherein the monitoring is carried out one or more of upstream of the seal gas compressor and downstream of the compressor; and a pH adjusting chemical injector coupled to the Distributed Control System and operable for adjusting the pH level of the water stream to maintain the pH level of the water stream within a predetermined range based on feedback from the one or more pH probes at the direction of the Distributed Control System. The direct reduction system maintains the pH level of the water stream upstream of the seal gas compressor in a range between 7.5 and 10. The direct reduction system maintains the pH level of the water stream downstream of the seal gas compressor in a range between 7.8 and 9.5. The direct reduction system further includes: a corrater probe coupled to the Distributed Control System and operable for monitoring a corrosiveness of the water stream used in the seal gas compressor, wherein the corrosiveness of the water stream is affected by the reformer flue gas stream that comes into contact with the water stream, and a corrosiveness chemical injector coupled to the Distributed Control System and operable for adjusting the corrosiveness of the water stream to maintain the corrosiveness of the water stream within a predetermined range based on feedback from the monitoring step. The direct reduction system further maintains the corrosiveness of the water stream in a range under 2.0 mpy. The corrosiveness chemical injector is operable for delivering one or more of a film forming, vapor phase, and electrochemical treatment to the water stream. Optionally, one of the one or more pH probes is collocated with the corrater probe.

BRIEF DESCRIPTION OF THE DRAWINGS

The present disclosure is illustrated and described herein with reference to the various drawings, in which like reference numbers are used to denote like system components/ methods steps, as appropriate, and in which.

DESCRIPTION OF EMBODIMENTS

Central to a DRI process is the seal gas system. The seal gas system protects both personnel and equipment from toxic gases and potential fires and explosions. The seal gas is used to exclude the flammable reducing gases (H2 and CO) from the atmosphere, thereby enabling the reaction of iron ore to be converted to metallic iron and protecting the environment outside the associated furnace. Additionally, the seal gas prevents the atmosphere from entering the furnace, which would inhibit the metallic reduction process.

The source of the seal gas is primarily flue gas from the reformer—which includes the byproducts of combustion. The make-up of the flue gas is typically:

$$CO_2\text{–}15\text{-}18\% \tag{6}$$

$$H_2O\text{–}20\text{-}22\% \tag{7}$$

$$N_2\text{–}60\text{-}65\% \tag{8}$$

$$O_2\text{–}<2\% \tag{9}$$

Other inert gases could be substituted—for example, a greater percentage of nitrogen, but flue gas is normally vented to atmosphere and is therefore an available and inexpensive source for the seal process.

Figure 1:
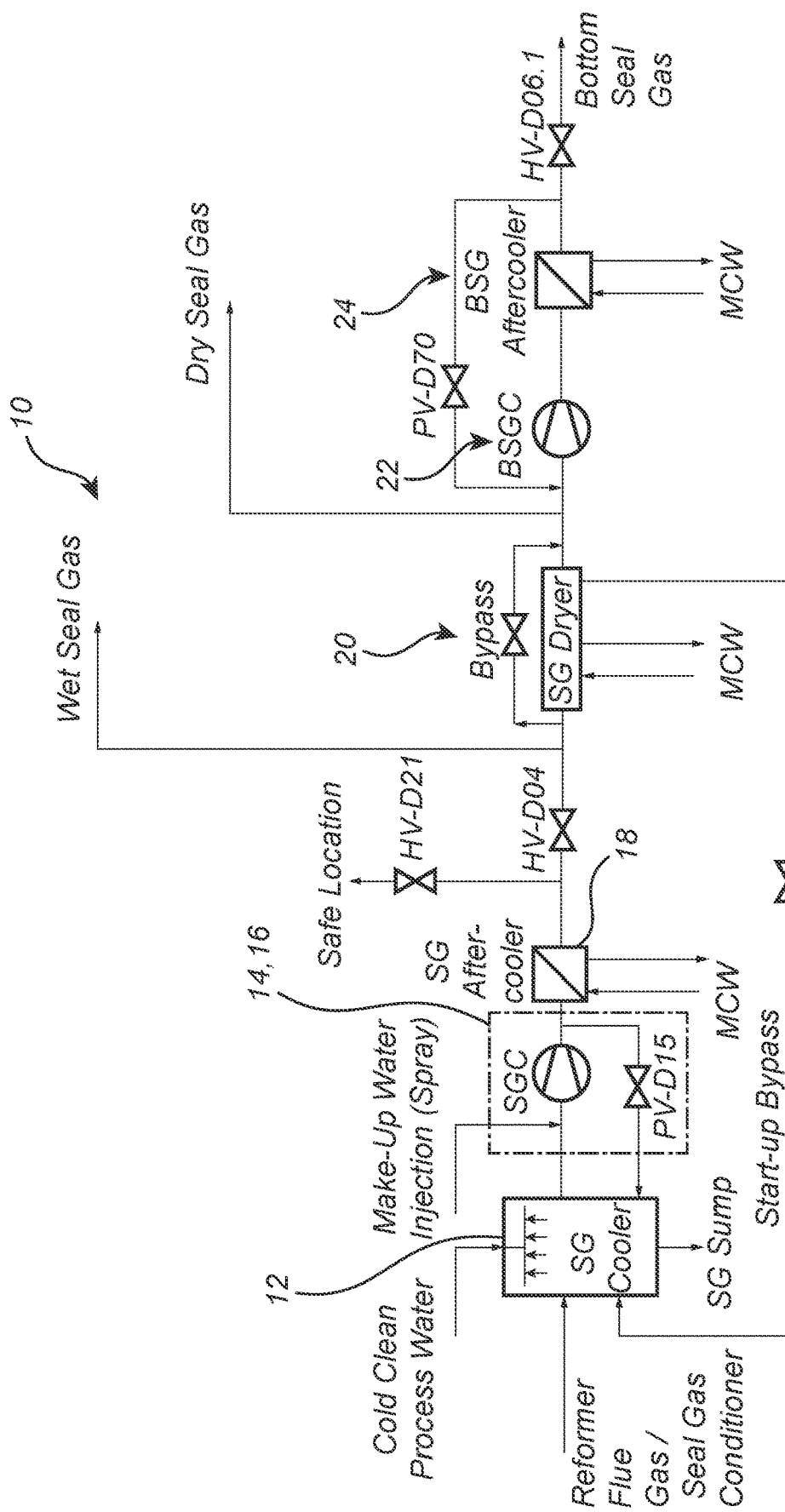
FIG. 1 is a schematic diagram illustrating one exemplary embodiment of the seal gas optimization system of the present disclosure.

Referring now specifically to FIG. 1, in one illustrative embodiment of the seal gas system 10 of the present disclosure, spent reformer flue gas and, optionally, seal gas conditioner are cooled from ~1000 C to 40 C in a seal gas cooler 12 and then enter the seal gas compressor 14, followed by a pulsation dampener 16. Following the pulsation dampener 16, the seal gas goes through a seal gas aftercooler 18 before being segmented into three streams—wet seal gas, dry seal gas, and bottom seal gas. The dry seal gas is distinguished from the wet seal gas in that the dry seal gas is passed through a seal gas dryer 20 (optionally with a bypass), while the bottom seal gas is further passed through a bottom seal gas compressor 22 and a bottom seal gas aftercooler 24. The water delivered to the seal gas compressor 14 includes cold, clean process water and make-up water (which may be spray injected subsequent to the seal gas cooler 12).

The general problem for seal gas compressor management is that the incoming feed water stream is impacted by the composition of the reformer flue gas. Generally the feed water used in the seal gas compressor is softened, clean industrial or RO water. The typical make-up analysis for this water is provided in Table 2 below.

TABLE 2

Full Water Chemistries

| Parameter | Unit | Raw Water | Soft Water | RO Water |
|---|---|---|---|---|
| pH | — | 7.0-9.0 | 8.0-9.0 | 5.0-7.0 |
| Conductivity | μS/m | 462 | — | — |
| Total suspended solids (TSS) | mg/l | 1 | <1 | <1 |
| Total dissolved solids (TDS) | mg/l | 320 | — | <25 |
| Oil and grease | mg/l | 1 | ND | ND |
| Total hardness | mg/l CaCO3 | 160 | <20 | <10 |
| Calcium hardness | mg/l CaCO3 | <35 | <10 | <5 |
| Magnesium hardness | mg/l CaCO3 | <50 | <10 | <5 |
| M alkalinity (TAC) | mg/l CaCO3 | 35 | Set by vendor based upon treatment | <5 |
| Chlorides | mg/l Cl⁻ | 60 | <60 | <5 |
| Sulphates | mg/l SO4 | 130 | <100 | <5 |
| Nitrates | mg/l NO3 | 5 | <5 | <5 |
| Sodium and potassium | mg/l Na | 43 | 113/<3 | <5/<2 |
| Total iron | mg/l Fe | 0.1 | <0.1 | <0.1 |
| Manganese | mg/l Fe | 0.05 | — | — |
| Silica | mg/l SiO2 | 10 | ND | ND |
| Turbidity, NTU | | <2 | <2 | <1 |
| TOC | ppm | 2 | — | <5 |

Regardless of the make-up water source, the $CO_2$ in the flue gas mixes with the make-up water stream and forms carbonic acid as follows:

$$CO_2(aq)+H_2O \leftrightarrow H_2CO_3(aq) \tag{10}$$

This is a weak acid, so some of it dissociates to produce H+ ions (see below), hence the incoming water stream to the seal gas compressor 14 is acidic. The pH could be as low as 4.5.

$$H_2CO_3(aq) \rightarrow H^+(aq)+HCO_3^-(aq) \tag{11}$$

$$HCO_3^-(aq)H^{30}(aq)+CO_3^{-2}(aq) \tag{12}$$

At this depressed water pH, the corrosion rate for the carbon steel and cast iron components is great. Without chemical adjustment to the water, the life of the equipment is greatly reduced.

A secondary concern if clean industrial water is used (and to a lesser extent if softened water is used) is the potential scaling that occurs due to the following reaction:

$$CaO+H_2O \rightarrow Ca(OH)_2 \tag{13}$$

$$Ca(OH)_2+CO_2 \rightarrow CaCO_3\downarrow+H_2O \tag{14}$$

In this reaction, as the heat of compression occurs, the precipitation of calcium carbonate increases because the solubility of calcium carbonate is inverse to temperature. Based upon the water chemistry (i.e., the calcium ions) and the pH adjustment chemical, scaling potential varies, but can be significant.

Both of these issues are ongoing concerns within DRI plants that use lobe compressors because the existing treatments and monitoring systems have not fully eliminated the aforementioned problems. Within the design of conventional DRI plants, no comprehensive solution to these problems has been developed. Typically, licensees and water treatment suppliers have offered some degree of problem avoidance, discussed below, but there is not a comprehensive resolution of the above reactions with the current state of equipment and process control. Due to these limitations, corrosion and scaling can result in the following:

1) Reduced production,
2) Excessive maintenance and repair requirements of the compressor or lobe components, the wet seal gas system, and the seal gas dryer 20,
3) Downstream deposition that hinders production rates,
4) Loss of product quality: re-oxidation of the metalized product, and/or
5) Indirectly, the occurrence of severe clustering in the furnace, increasing downtime for removing it.

Buffering feed solutions have the desired outcome of adjusting the pH out of the corrosion range between 7.5 and 9.0, but result in excessive feed scaling and under-feed corrosion, which is controlled by a dosing pump and optional timer. Excessive feeding can cause too high a pH (>10.0) and result in scaling of the lobes and caustic buildup downstream of the seal gas compressor 14, with under-feeding (pH<7.0) simply allowing corrosion problems to continue. No real measurement method is available in the applicable environment and the practical outcome is inconsistent performance and consistent field checks to ensure that the system is working properly. It is not currently possible to monitor discharge water pH, resulting in inconsistent performance, no real time data to make decisions, and the requirement for frequent manual system checks.

Corrosion inhibitor solutions have the desired outcome of reducing seal gas compressor corrosion by providing electrochemical protection of the compressor parts and lobes with water treatment chemicals, but provide inconsistent chemical feed or effectiveness because the pH is often incorrect, which is again controlled by a dosing pump and optional timer. If the pH control is not working properly, the chemical control is less effective because the chemicals used have effective and ineffective pH ranges. Performance is based upon levels of active chemistry in the water, and the chemicals do not protect downstream, where gaseous vapors carry moisture and film formers and vapor phase inhibitors are needed. Coupons provide lagging indicators and a corrater provides a real time indicator and the practical outcome is a lack or real time decision making and potential corrater failure if scaling in the system occurs.

Alternative metallurgical lobe material (stainless steel and nickel) solutions have the desired outcome of providing improved lobe performance and longer equipment life, but are expensive. Lobe life is improved, but corrosive water still affects the pipework utilized.

Figure 2:
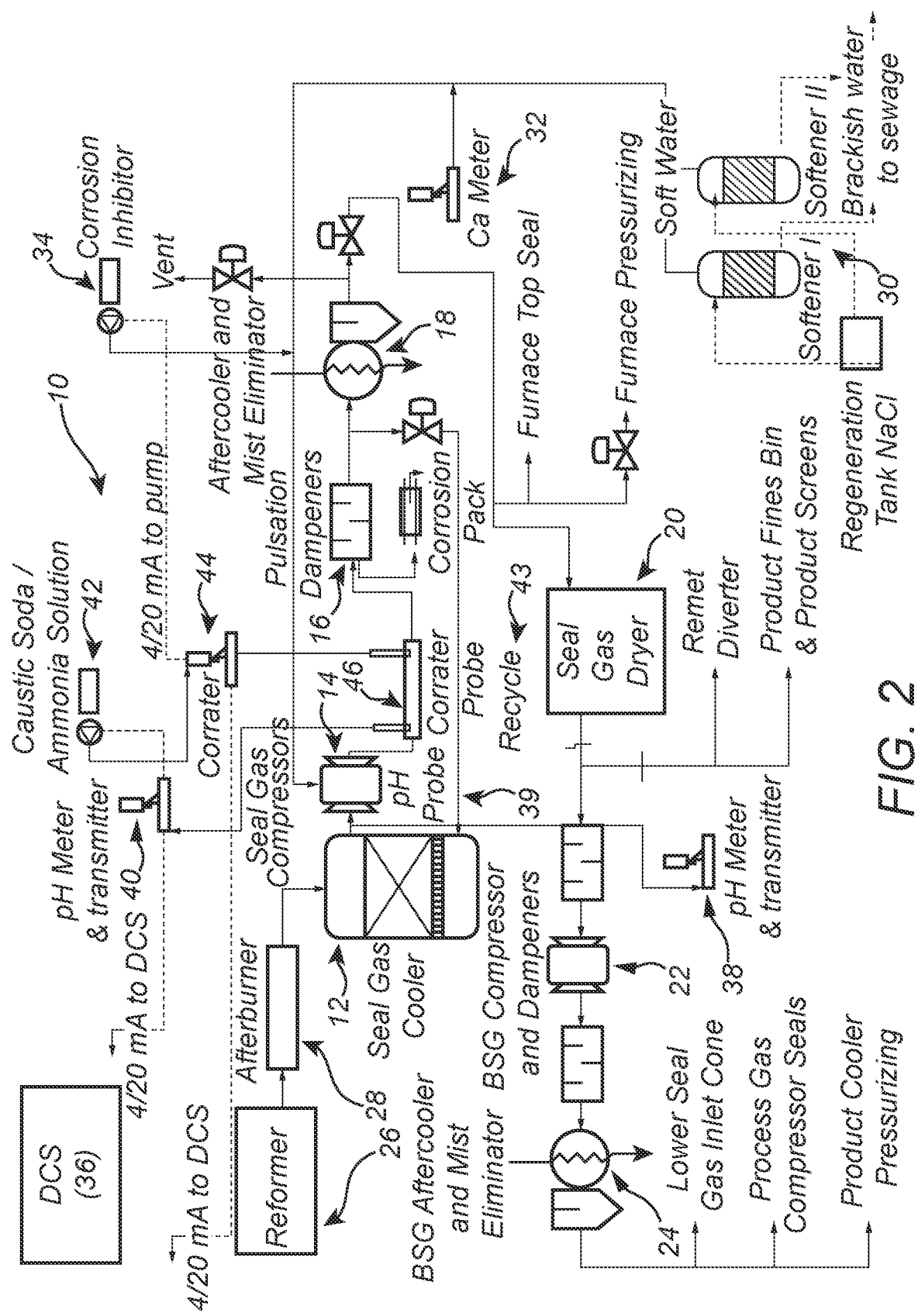
FIG. 2 is a schematic diagram illustrating another exemplary embodiment of the seal gas optimization system of the present disclosure.

Referring now specifically to FIG. 2, in another illustrative embodiment of the seal gas system 10 of the present disclosure, spent reformer flue gas from a reformer 26 and afterburner 28 and, optionally, seal gas conditioner are cooled from ~1000 C to 40 C in the seal gas cooler 12 and then enter the seal gas compressor 14, followed by the pulsation dampeners 16. Following the pulsation dampeners 16, the seal gas goes through the seal gas aftercooler 18 before being segmented into the three streams—wet seal gas, dry seal gas, and bottom seal gas. The dry seal gas is distinguished from the wet seal gas in that the dry seal gas is passed through the seal gas dryer 20 (optionally with a bypass), while the bottom seal gas is further passed through the bottom seal gas compressor 22 and the bottom seal gas aftercooler 24. Here, the water delivered to the seal gas compressor 14 includes soft water delivered from one or more water softeners 30, and monitored by a calcium meter 32. A corrosion inhibitor injector 34 is fluidly coupled to the soft water stream and controlled by the DCS 36, which is in communication with the corrosion inhibitor injector 34.

Functionally, the critical variable which monitors the corrosive nature of the $CO_2$ gas laden water—pH—is reliable, and effective in the environment which heretofore did not exist. A pH probe 38 monitors incoming water pH used in the SGC 14. With DCS control, the proper level of corrosion/scale inhibitor injection into the water stream can be accomplished. The incoming pH range is shown in the Table 3 below, which also references the range which the process is maintained.

TABLE 3

| Incoming pH Water Stream | | | |
|---|---|---|---|
| Incoming pH without treatment | Incoming pH with treatment | Lower acceptable limit | Upper acceptable limit |
| 4.5-6.0 | 7.8-9.0 | 7.5 | 10.0 |

In order to ensure incoming flue gas $CO_2$ levels are adjusted throughout the process, a secondary pH monitor 40 on the SGC drain is utilized. The discharge pH is in the ranges shown in Table 4.

TABLE 4

| Discharge pH Water Stream | | | |
|---|---|---|---|
| Discharge pH without treatment | Discharge pH with treatment | Lower acceptable limit | Upper acceptable limit |
| 5.5-6.0 | 8.2-9.0 | 7.8 | 9.5 |

This second probe 40 is incorporated into a compressor discharge drain sufficient in capacity to enable the probe 40 to have a continuous stream of discharge water moving throughout the process. The pH probes 38, 40 are integrated into the DCS system 36 so that upper and lower acceptable ranges pH can be maintained. The control of the pH is enabled by a DCS signal to the chemical feed pump 42 based upon continuous monitoring.

Figure 3:
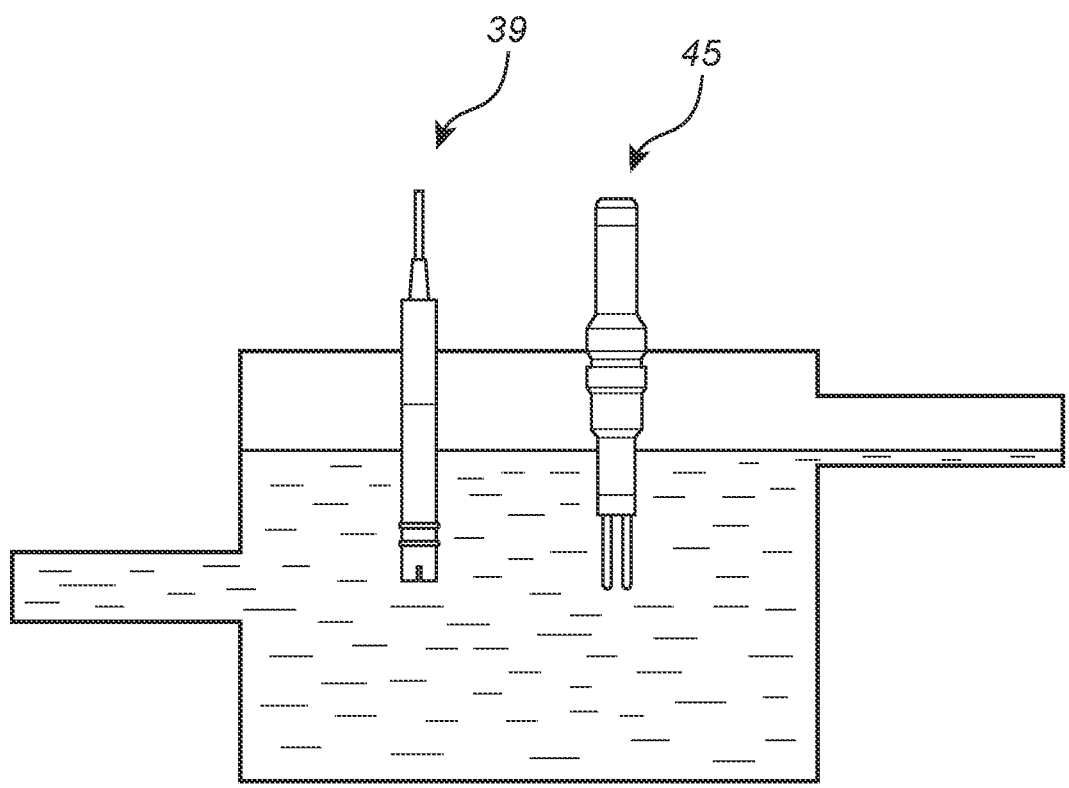
FIG. 3 is a schematic diagram illustrating a further exemplary embodiment of the seal gas optimization system of the present disclosure.

The corrosion control methodology of the present disclosure differs from current practices due to the use of multiple functionality corrosion inhibitors. As illustrated in FIG. 3, the corrater probe 45 is disposed adjacent to the pH probe 39 of one of the pH monitors 40. The corresponding treatment 34 includes film forming, vapor phase, and surface-active chemistries fed into the entry water stream of the SGC 14 along with the pH adjustment 42. The chemical dosing is predicated on the make-up water source, and the system 10 uses a real time corrater 44 at the discharge of the SGC 14 to determine the corrosion rate in mpy. Additionally, a corrosion rack 46 with standard 1018 steel coupons or the like is evaluated every 45 days (using the ASTM D4778-15 test method), for example, as a redundant test. The corrosion rate limits applied are provided in Table 5.

TABLE 5

| Corrosion Rates | | | |
|---|---|---|---|
| Corrosion rate without chemical treatment | Corrosion Rate with chemical treatment | Lower acceptable limit | Upper acceptable limit |
| >20 mpy | 0.1-1.0 mpy | NA | 2.0 mpy |

The corrater probe 45 is located adjacent to the pH probe 39 and likewise wired to the DCS 36 (FIG. 2). The corrater 44 (FIG. 2) has an upper corrosion rate established for optimal control. It is not required to have a lower limit, as the process objective is to minimize corrosion. At any point when the corrosion rate exceeds 2.0 mpy, the chemical feed pump 34 (FIG. 2) with a signal from the DCS 36 increases feed until the rate drops down below 1.0 mpy, for example.

Thus, the use of a reliable pH probe to control such a process has not been done before. The present disclosure incorporates the following unique features into a probe that can now be used in this environment with high reliability and accuracy. These probe features are listed below:

- Glass formulation is environmentally appropriate,
- Chemically designed to withstand the environment, resulting in chemical and wear resistance.
- Resistant to aggressive gases,
- Resistant to abrasion and high velocity solids,
- Electronic transmission function,
- Solid state construction is completely sealed and customized to the environment,
- No internal O-rings are used as these degrade and are prone to failure,
- No gels or electrolytes as these can easily contaminate and increase maintenance,
- Extremely large surface area reduces fouling and improves reliability,
- Glass characteristics result in very low drift and reliable readings over prolonged periods—2-4 weeks, with no daily adjustment required,
- Glass construction is highly durable, and
- Double and triple junction construction provides long life.

Thus, reliable pH monitoring enables reformer flue gas cooling water to be correctly buffered to prevent corrosion and scaling conditions from occurring. Real time monitoring via the DCS enables pH buffering to be adjusted as needed. The redundant monitoring feature on the discharge of the compressor will ensures pH control and that buffering is not under or over fed. Chemical corrosion control is effectively maintained as the correct pH of the water enables the corrosion control products to be utilized at the proper pH—efficacy of treatment is enhanced. Corrosion rates (and thereby the efficacy) are monitored and controlled through the DCS and ensure that desired results are achieved within the desired ranges. Corrosion control uses vapor phase, film forming, and surface acting inhibitors so the compressor and downstream processes (prior to the dryers) are enhanced and a protective layer is formed and maintained. Vapor phase control ensures that water droplets in the seal gas do not cause further corrosion prior to the dryer. All the aerosol water droplets that leave the gas phase (i.e., condense) deposit with a neutral pH, thereby reducing the corrosive nature of the water. As a result of all this, the seal gas compressor and sundry equipment operate more reliably and result in optimized production because maintenance and repairs caused by corrosion or scale build up are eliminated.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method for operating a seal gas compressor utilized in a direct reduction process, the method comprising:
    monitoring a pH level of a water stream used in the seal gas compressor, wherein the pH level of the water stream is affected by a reformer flue gas stream that comes into contact with the water stream, wherein the monitoring step is carried out at one or more locations upstream of the seal gas compressor and downstream of the seal gas compressor;
    adjusting the pH level of the water stream to maintain the pH level of the water stream within a predetermined range based on feedback from the monitoring step;
    monitoring a corrosiveness of the water stream used in the seal gas compressor, wherein the corrosiveness of the water stream is affected by the reformer flue gas stream that comes into contact with the water stream; and
    adjusting the corrosiveness of the water stream to maintain the corrosiveness of the water stream within a predetermined range under 2.0 mpy based on feedback from the monitoring step.

2. The method of claim 1, further comprising maintaining the pH level of the water stream upstream of the seal gas compressor in a range between 7.5 and 10.

3. The method of claim 1, further comprising maintaining the pH level of the water stream downstream of the seal gas compressor in a range between 7.8 and 9.5.

4. The method of claim 1, wherein adjusting the pH level of the water stream comprises injecting a pH adjusting chemical into the water stream based on the feedback from the monitoring step.

* * * * *